US010409028B2

(12) United States Patent
Hu et al.

(10) Patent No.: US 10,409,028 B2
(45) Date of Patent: Sep. 10, 2019

(54) LENS DRIVING MODULE

(71) Applicant: TDK TAIWAN CORP., Yangmei Taoyuan (TW)

(72) Inventors: Chao-Chang Hu, Yangmei Taoyuan (TW); Jyun-Jie Lin, Yangmei Taoyuan (TW)

(73) Assignee: TDK TAIWAN CORP., Yangmei Taoyuan (TW)

( * ) Notice: Subject to any disclaimer, the term of this patent is extended or adjusted under 35 U.S.C. 154(b) by 92 days.

(21) Appl. No.: 15/351,873

(22) Filed: Nov. 15, 2016

(65) Prior Publication Data

US 2017/0168259 A1 Jun. 15, 2017

Related U.S. Application Data

(60) Provisional application No. 62/265,161, filed on Dec. 9, 2015.

(30) Foreign Application Priority Data

Oct. 5, 2016 (TW) ............................ 105132165 A

(51) Int. Cl.
*G02B 7/10* (2006.01)
*H02K 1/12* (2006.01)
(Continued)

(52) U.S. Cl.
CPC ............... *G02B 7/102* (2013.01); *H02K 1/12* (2013.01); *H02K 3/28* (2013.01); *H02K 41/00* (2013.01); *H02K 41/0356* (2013.01); *H02K 1/34* (2013.01)

(58) Field of Classification Search
CPC H02K 1/12; H02K 3/28; H02K 41/00; H02K 41/0356
(Continued)

(56) References Cited

U.S. PATENT DOCUMENTS 6,570,828 B2 * 5/2003 Kikuchi ............... G11B 7/0932 369/44.32
7,199,949 B2 * 4/2007 Haruguchi ........... G11B 7/0933 359/813

(Continued)

FOREIGN PATENT DOCUMENTS

CN 103995339 A 8/2014
TW 201435425 A 9/2014
TW 201443540 A 11/2014

OTHER PUBLICATIONS

Office Action dated Apr. 18, 2017 in corresponding TW Application No. 105132165, 5 pages.

*Primary Examiner* — James R Greece
(74) *Attorney, Agent, or Firm* — Muncy, Geissler, Olds & Lowe, P.C.

(57) ABSTRACT

A lens driving module for holding and moving a lens is provided, including a lens holder having an accommodating space, a driving coil, a plurality of first magnetic members having a longitudinal structure, a virtual plane, and a plurality of second magnetic members, wherein the lens is disposed in the accommodating space. The lens holder is disposed between the first magnetic members and between the second magnetic members. The driving coil is disposed on the lens holder and surrounds the accommodating space. The virtual plane is perpendicular to a longitudinal axis of the longitudinal structure. The projections of the driving coil and the first magnetic members on the virtual plane along the longitudinal axis of the longitudinal structure overlap each other. When a first current flows through the driving coil, the lens holder moves relative to the first and second magnetic members along a first direction.

16 Claims, 6 Drawing Sheets

(51) Int. Cl.

| | |
|---|---|
| ***H02K 3/28*** | (2006.01) |
| ***H02K 41/00*** | (2006.01) |
| ***H02K 41/035*** | (2006.01) |
| *H02K 1/34* | (2006.01) |

(58) Field of Classification Search
USPC .......................................................... 359/696
See application file for complete search history.

(56) References Cited

U.S. PATENT DOCUMENTS

| | | | | |
|---|---|---|---|---|
| 7,287,264 | B2 * | 10/2007 | Akanuma | G11B 7/0932 720/681 |
| 7,543,312 | B2 * | 6/2009 | Kim | G11B 7/093 720/683 |
| 7,768,879 | B2 * | 8/2010 | Ohkuma | G11B 7/0933 369/44.11 |
| 8,269,840 | B2 * | 9/2012 | Lee | G02B 27/646 348/208.11 |
| 8,514,327 | B2 | 8/2013 | Ku | |
| 2007/0097532 | A1 * | 5/2007 | Kuo | G02B 7/023 359/823 |

* cited by examiner

LENS DRIVING MODULE

CROSS REFERENCE TO RELATED APPLICATIONS

This application claims the benefit of U.S. Provisional Application No. 62/265,161, filed Dec. 9, 2015, and Taiwan Patent Application No. 105132165, filed Oct. 5, 2016, the entirety of which are incorporated by reference herein.

BACKGROUND OF THE INVENTION

Field of the Invention

The application relates in general to a lens driving module, and in particular, to a lens driving module for holding and moving a lens.

Description of the Related Art

As technology has advanced, a lot of electronic devices (for example, cameras and smartphones) have the functionality of taking photographs or recording video. These electronic devices have become more commonplace, and have been developed to be more convenient and thin. More and more choices are provided for users to choose from.

However, since electronic devices have become thinner, current zoom lenses cannot be disposed in these miniaturized electronic devices. Therefore, how to solve the aforementioned questions has become an important issue.

BRIEF SUMMARY OF INVENTION

To address the deficiencies of conventional products, an embodiment of the invention provides a lens driving module for holding and moving a lens, including a lens holder having an accommodating space, a driving coil, a plurality of first magnetic members having a longitudinal structure, a virtual plane, and a plurality of second magnetic members, wherein the lens is disposed in the accommodating space. The lens holder is disposed between the first magnetic members and between the second magnetic members. The driving coil is disposed on the lens holder and surrounds the accommodating space. The virtual plane is perpendicular to a longitudinal axis of the longitudinal structure. The projections of the driving coil and the first magnetic members on the virtual plane along the longitudinal axis of the longitudinal structure overlap each other. When a first current flows through the driving coil, the lens holder moves relative to the first magnetic members and the second magnetic members along a first direction.

In some embodiments, each of the magnetic members comprises an inclined surface facing the driving coil.

In some embodiments, a gap is formed between two first magnetic members on the same sides of the driving coil.

In some embodiments, the lens driving module further comprises a third magnetic member, disposed in the gap.

In some embodiments, the width of the third magnetic member is less than that of the first magnetic member.

In some embodiments, the third magnetic member does not protrude from the outer surface of the first magnetic member.

In some embodiments, the first magnetic member comprises a depression, and the driving coil enters the depression.

In some embodiments, the length of the driving coil exceeds the width of the driving coil.

In some embodiments, the distance between the driving coil and the outer surface of the first magnetic member is less than the distance between the driving coil and the outer surface of the second magnetic member.

In some embodiments, the longitudinal axis of the longitudinal structure is perpendicular to the first direction.

In some embodiments, the lens driving module further comprises a base and a plurality of suspension wires. The base comprises a coil plate. The suspension wires connect the coil plate and the first elastic member. When a second current flows through the coil plate, the lens holder moves relative to the base along a second direction, wherein the first direction is perpendicular to the second direction.

In some embodiments, the base further comprises a circuit board electrically connected to the coil plate.

In some embodiments, the lens driving module further comprises a position detector disposed on the base.

In some embodiments, the position detector comprises a Hall sensor, a magnetoresistance effect sensor, a giant magnetoresistance effect sensor, a tunneling magnetoresistance effect sensor, or a fluxgate sensor.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the lens driving module are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood to one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
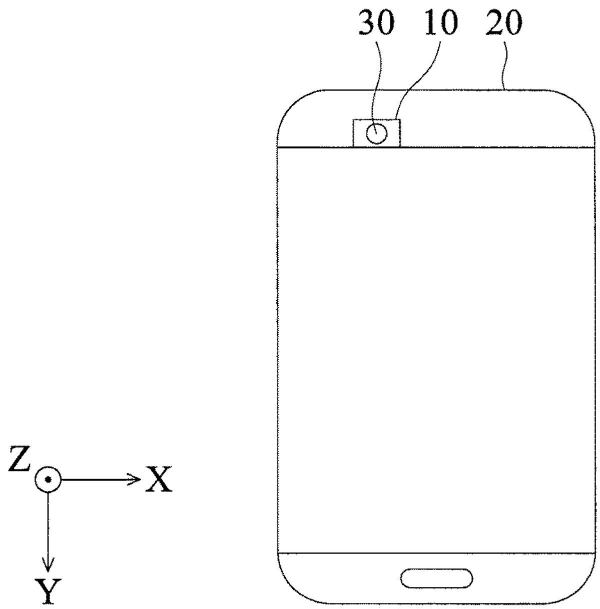
FIG. 1 is a schematic diagram of an electronic device according to an embodiment of the invention.

Referring to FIG. 1, in an embodiment of the invention, the lens driving module 10 can be disposed in an electronic device 20. The lens driving module 10 is used to hold a lens 30 and drive the lens 30 to move relative to an image sensor in the electronic device 20, so as to achieve the purpose of focus adjustment and autofocus. For example, the electronic device 20 can be a digital camera or a smart phone having the function of capturing photographs or making video recordings.

Figure 2:
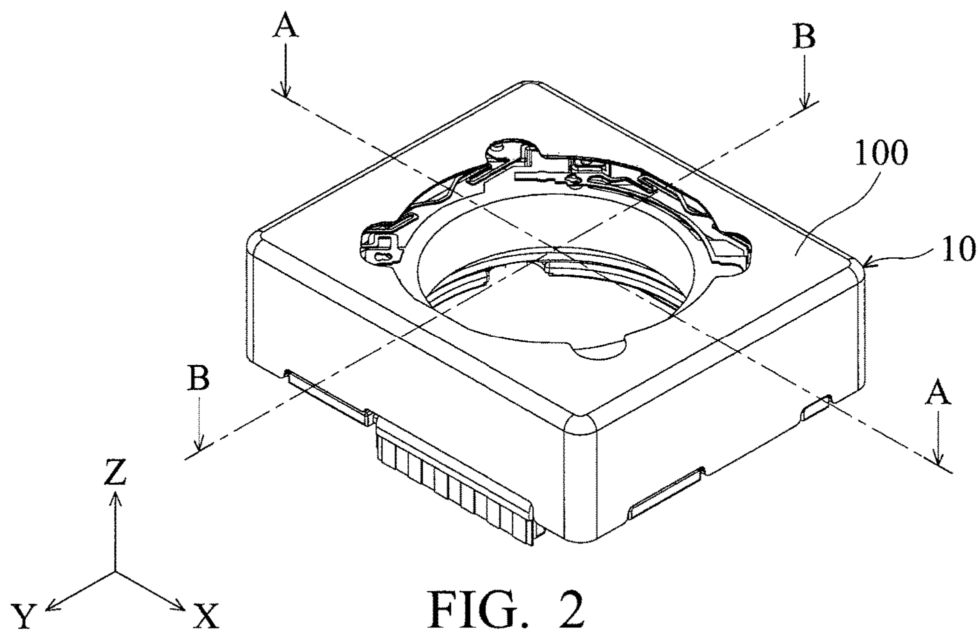
FIG. 2 is an schematic diagram of a lens driving module according to an embodiment of the invention.
Figure 3:
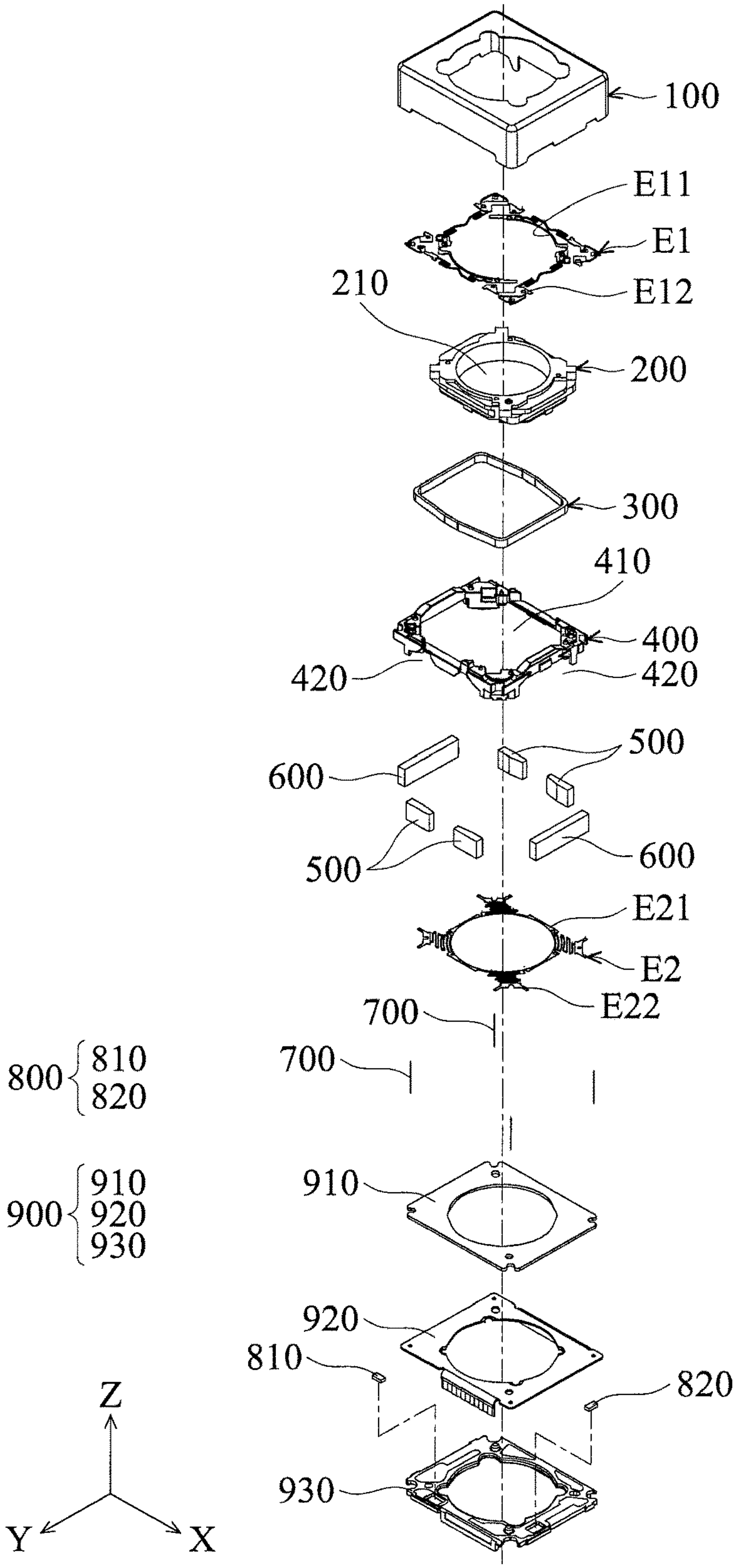
FIG. 3 is an exploded-view diagram of a lens driving module according to an embodiment of the invention.
Figure 4:
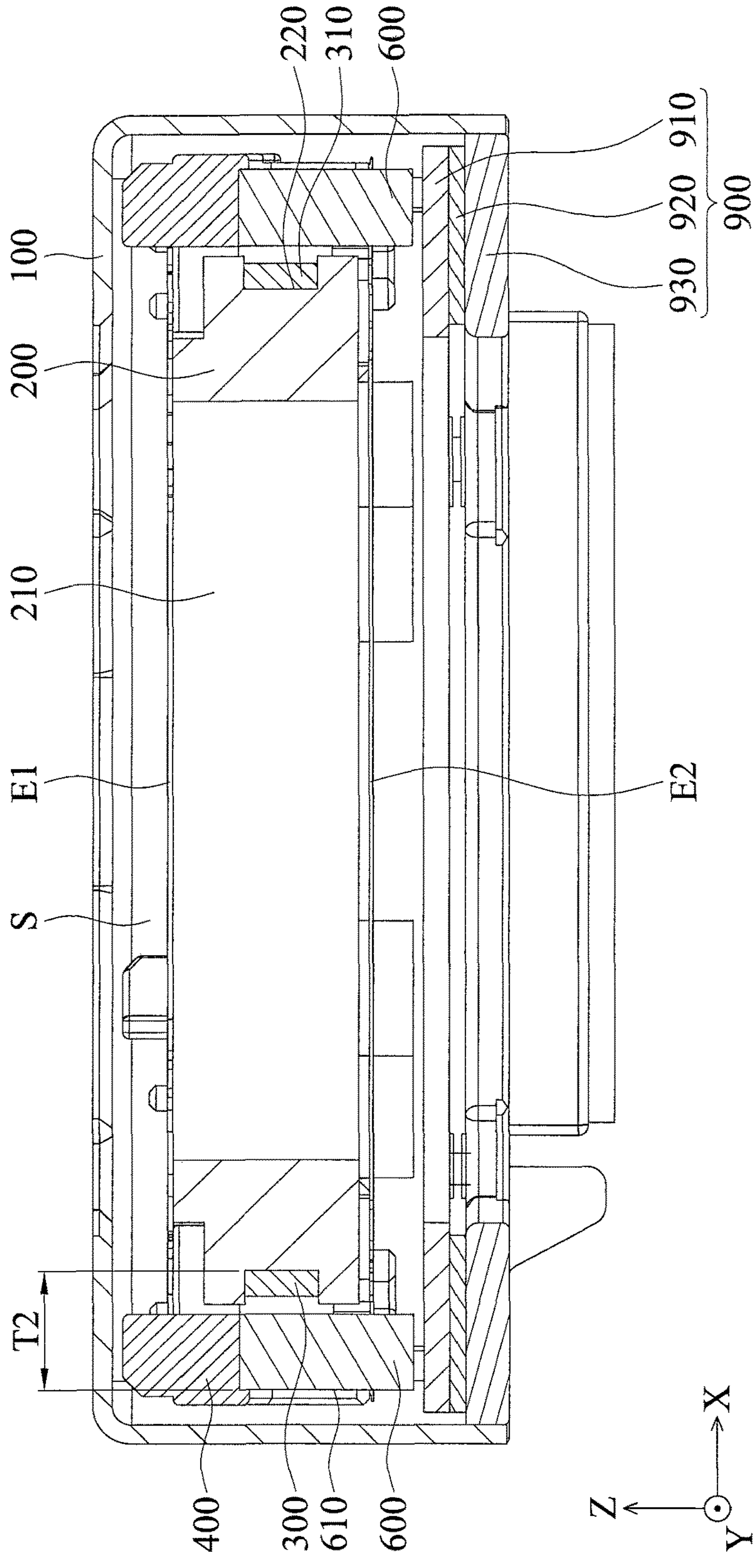
FIG. 4 is a cross-sectional view along line A-A in FIG. 2.
Figure 5:
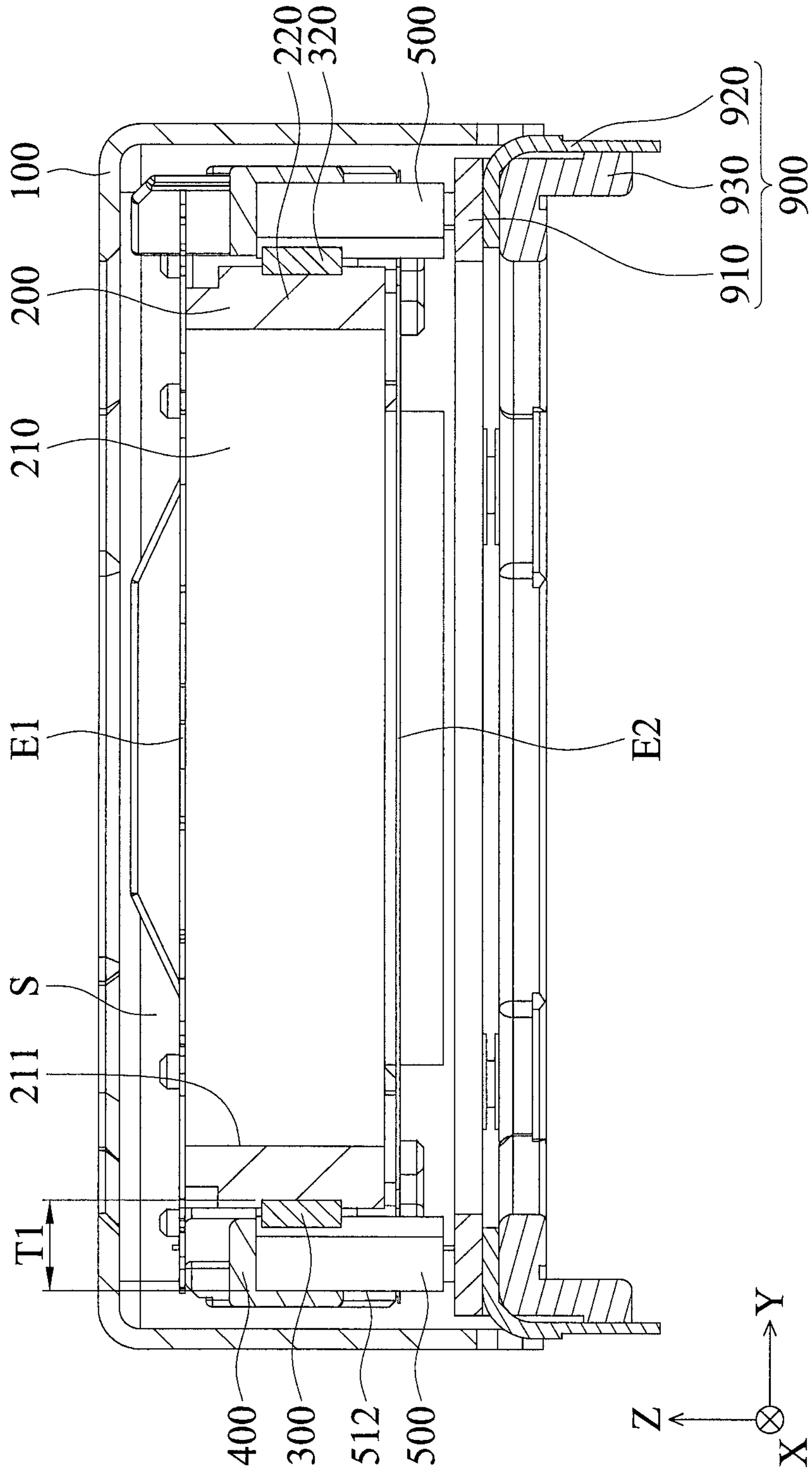
FIG. 5 is a cross-sectional view along line B-B in FIG. 2.

FIGS. 2 and 3 respectively represent a schematic diagram and an exploded-view diagram of the aforementioned lens driving module 10, and FIGS. 4 and 5 respectively represent cross-sectional views along line A-A and line B-B in FIG. 2. As shown in FIGS. 2 and 3, the lens driving module 10 primarily comprises an upper cover 100, a first elastic member E1, a lens holder 200, a driving coil 300, a frame 400, a plurality of first magnetic members 500, a plurality of second magnetic members 600, a second elastic member E2, a plurality of suspension wires 700, a plurality of position detectors 800, and a base 900.

Referring to FIGS. 3-5, the lens holder 200 has an accommodating space 210 and a concave structure 220, wherein the accommodating space 210 is formed at the center of the lens holder 200, and the concave structure 220 is formed on the outer wall of the lens holder 200 and surrounds the accommodating space 210. The lens 30 in FIG. 1 can be affixed to the lens holder 200 and accommodated in the accommodating space 210. The driving coil 300 can be disposed in the concave structure 220.

The frame 400 has a receiving portion 410 and a plurality of recesses 420. The lens holder 200 is received in the receiving portion 410. The first and second magnetic members 500 and 600 are fixed in the recesses 420 and adjacent to the driving coil 300. In the direction of the Y-axis, the lens holder 200 is disposed between the first magnetic members 500. In the direction of the X-axis, the lens holder 200 is disposed between the second magnetic members 600. When a first current flows through the driving coil 300, electromagnetic induction is generated between the driving coil 300 and the first and second magnetic members 500 and 600. Thus, the lens holder 200 and the lens 30 disposed thereon can move upwardly or downwardly relative to the first and second magnetic members 500 and 600 along the direction of the Z-axis (the first direction), and the purpose of focus adjustment and image stabilization can be achieved.

Figure 6:
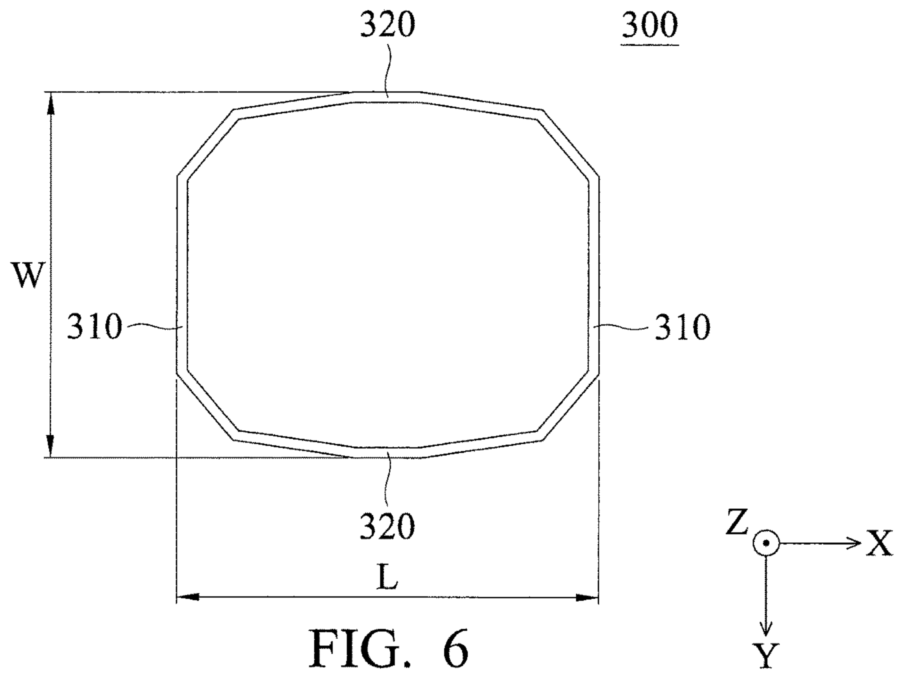
FIG. 6 is a schematic diagram of a driving coil according to an embodiment of the invention.

As shown in FIG. 6, in this embodiment, the driving coil 300 has corresponding portions 310 and non-corresponding portions 320, wherein the corresponding portions 310 are situated at the left and right sides of the driving coil 300, and the non-corresponding portions 320 are situated at the upper and lower sides of the driving coil 300. The distance between the corresponding portions 310 forms the length L of the driving coil 300, and the distance between the non-corresponding portions 320 forms the width W of the driving coil 300. Specially, the length L exceeds the width W, and the distance between the upper side and the lower side of the driving coil 300 is decreased from the non-corresponding portion 320 to the corresponding portion 310.

Figure 7:
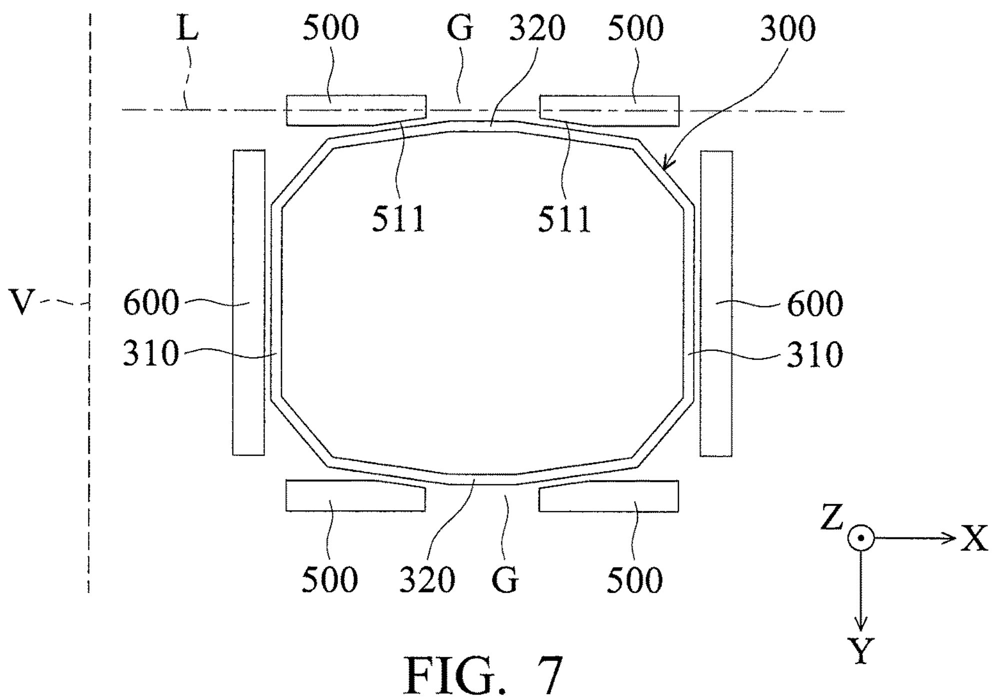
FIG. 7 is a schematic diagram of the relative position between the driving coil and the first and second magnetic members according to an embodiment of the invention.

Referring to FIG. 7, it should be noted that the first magnetic member 500 of the lens driving module 10 comprises a longitudinal structure, and a virtual plane V is formed perpendicular to the longitudinal axis L of the longitudinal structure. The longitudinal axis L of the longitudinal structure is perpendicular to the aforementioned first direction. A gap G can be formed between two first magnetic members 500 on the same side of the driving coil 300, and the non-corresponding portion 320 of the driving coil 300 can extend toward the gap G. Therefore, the projections of the driving coil 300 and the first magnetic members 500 on the virtual plane V along the longitudinal axis L of the longitudinal structure overlap each other.

Due to the arrangement of the driving coils 300 and the first magnetic members 500, the distance T1 between the driving coil 300 and the outer surface 512 of the first magnetic member 500 is less than the distance T2 between the driving coil 300 and the outer surface 610 of the second magnetic member 600 (as shown in FIGS. 4 and 5). Thus, the width of the lens driving module 10 in the direction of the Y-axis can be reduced, and the lens driving module 10 can be accommodated in a miniaturized electronic device 20.

Furthermore, as shown in FIG. 7, in this embodiment, an inclined surface 511 facing the driving coil 300 is formed on the first magnetic member 500, such that the region for generating electromagnetic induction is increased, and the driving force of the lens driving module 10 is improved.

Figure 8:
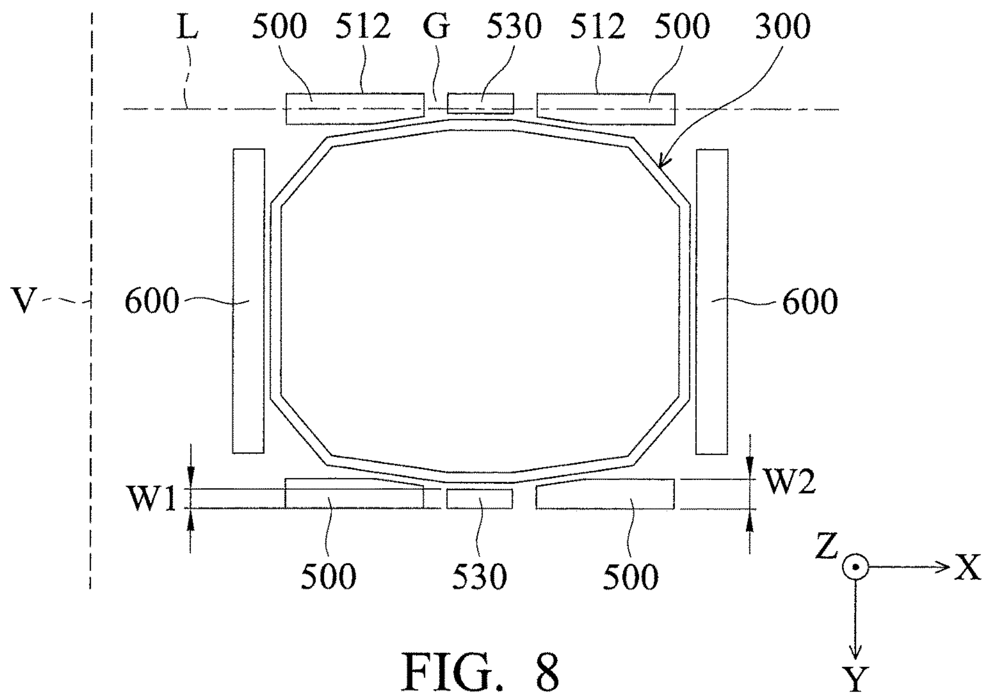
FIG. 8 is a schematic diagram of the relative position between the driving coil and the first and second magnetic members according to another embodiment of the invention.

Referring to FIG. 8, in another embodiment of the invention, the lens driving module 10 can comprise at least one third magnetic members 530 disposed in the gap G between the first magnetic members 500. The region for generating electromagnetic induction can be increased even more by the third magnetic member 530. It should be noted that the third magnetic member 530 does not protrude from the outer surfaces 512 of the first magnetic members 500, and the width W1 of the third magnetic member 530 is less than the width W2 of the first magnetic member 500, so as to prevent the width of the lens driving module 10 from increasing in the direction of the Y-axis.

Figure 9:
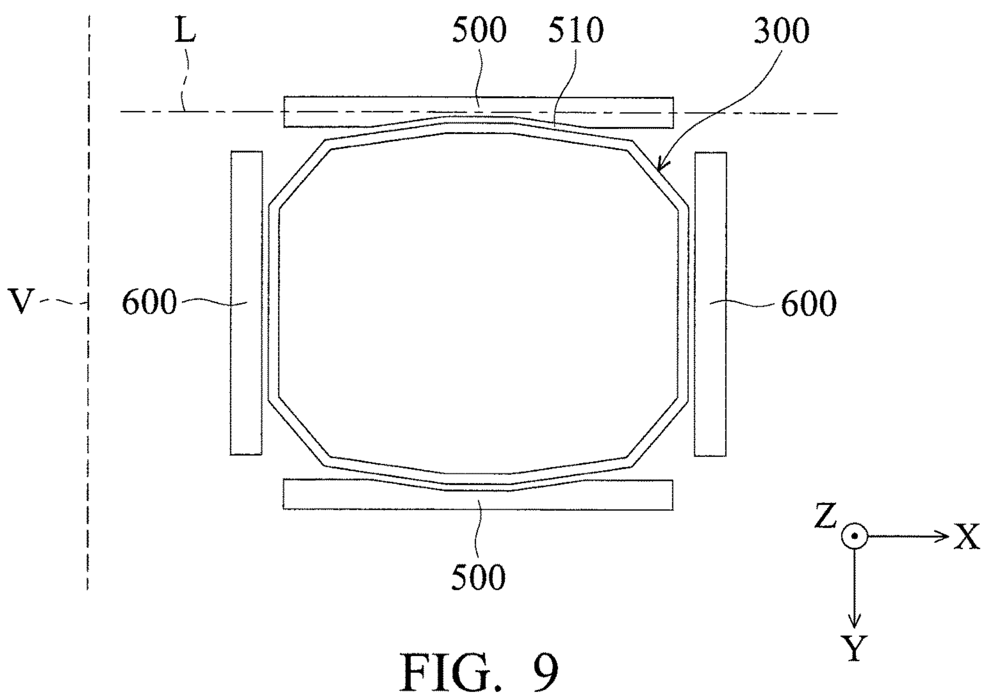
FIG. 9 is a schematic diagram of the relative position between the driving coil and the first and second magnetic members according to another embodiment of the invention.

As shown in FIG. 9 in another embodiment of the invention, a depression 510 can be formed on the first magnetic member 500 by partial trimming. The number of components can be reduced.

In FIGS. 3-5, the first elastic member E1 and the second elastic member E2 respectively disposed on the upper side and the lower side of the lens holder 200/frame 400, and the lens holder 200/frame 400 can be disposed therebetween. The inner portion E11 of the first elastic member E1 is connected to the lens holder 200, and the outer portion E12 is connected to the frame 400. Similarly, the inner portion E21 of the second elastic member E2 is connected to the lens holder 200, and the outer portion E22 is connected to the frame 400. Thus, the lens holder 200 can be hung in the receiving portion 410 of the frame 400 by the first elastic member E1 and the second elastic member E2, and the range of motion of the lens holder 200 in the direction of the Z-axis can also be restricted by the first and second elastic members E1 and E2.

Referring to FIGS. 3-5, the base 900 of the lens driving module 10 comprises a coil plate 910, a circuit board 920, and a lower cover 930. The coil plate 910 is affixed to the circuit board 920 and electrically connected to the other electronic components (not shown) in the electronic device 20. Furthermore, in the electronic device 20, the image sensor (not shown) corresponding to the lens 30 is usually disposed under the base 200 and affixed relative to the base 200. Light can pass through the lens 30 in the accommodating space 210 and form an image on the image sensor.

When a second current flows through the coil plate 910, electromagnetic induction is generated between the coil plate 910 and the first and second magnetic members 500 and 600. Thus, the lens holder 200 and the frame 400 can move relative to the base 900 along the direction of the X-axis and/or the direction of the Y-axis, and image stabilization can be achieved. In other words, when the second current flows through the coil plate 910, the lens holder 200 and the frame 400 can move relative to the base 900 along a second direction, wherein the second direction is perpendicular to the first direction.

As shown in FIG. 3, in this embodiment, four suspension wires 700 are respectively disposed on the four corners of the coil plate 910, and connect the coil plate 910, the circuit board 920 and the first elastic member E1. When the lens holder 200 and the lens 30 moves relative to the frame 400 along the second direction, the suspension wires 700 can restrict their range of motion. Moreover, since the suspension wires 700 comprise metal (copper or an alloy thereof), the suspension wires 700 can be used as a conductor, for example, the first current can flow into the driving coil 300 through the circuit board 920 and the suspension wires 700.

In this embodiment, the position detector 800 comprises an X-axis position detector 810 and a Y-axis position detector 820, wherein the X-axis position detector 810 and the Y-axis position detector 820 are affixed to the lower cover 930 of the base 900. The X-axis position detector 810 corresponds to the first magnetic member 500, and the position of the lens holder 200 and the lens 30 in the direction of the X-axis can be confirmed by detecting the movement of the first magnetic member 500. The Y-axis position detector 810 corresponds to the second magnetic member 500, and the position of the lens holder 200 and the lens 30 in the direction of the Y-axis can be confirmed by detecting the movement of the second magnetic member 600.

The position detector 800 can be a Hall sensor, a magnetoresistance effect sensor (MR sensor), a giant magnetoresistance effect sensor (GMR sensor), a tunneling magnetoresistance effect sensor (TMR sensor), or a fluxgate sensor.

When the upper cover 100 and the lower cover 930 are assembled and affixed to each other, an accommodating space S can be formed therebetween. The lens holder 200, the driving coil 300, the frame 400, the first magnetic members 500, the second magnetic members 600, the suspension wires 700, the position detectors 800, the coil plate 910, the circuit board 920, the first elastic member E1, and the second elastic member E2 are disposed in the accommodating space S. It should be noted that the upper cover 100 and the base 900 has openings corresponding to the accommodating space 210. Therefore, when the lens moves along the Z-axis, it can pass through the opening without impacting the upper cover 100 or the lower cover 930, and light can pass through the openings and reach the lens 30 or the image sensor.

In summary, a lens driving module for holding and moving a lens is provided. Since the driving coil can enter the gap between the first magnetic members 500, the width of the lens driving module can be reduced, and the lens driving module can be disposed in a miniaturized electronic device.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A lens driving module for holding and moving a lens, comprising:

a lens holder, having an accommodating space, wherein the lens is disposed in the accommodating space;

a driving coil, disposed on the lens holder and surrounding the accommodating space;

a plurality of first magnetic members, having a longitudinal structure, wherein the driving coil is disposed between the first magnetic members, and does not surround the first magnetic members as observed from an optical axis of the lens;

a virtual plane, perpendicular to the longitudinal axis of the longitudinal structure, wherein the projections of the driving coil and the first magnetic members on the virtual plane along the longitudinal axis overlap each other; and a plurality of second magnetic members, wherein the lens holder is disposed between the second magnetic members, wherein when a first current flows through the driving coil, the lens holder moves relative to the first magnetic members and the second magnetic members along a first direction, wherein the driving coil has a first section and a second section, and the extending direction of the first section is different from the extending direction of the second section, wherein at least a portion of the first section is disposed between the first magnetic members, at least a portion of the second section is disposed between the first magnetic members, and the magnetic members and the first and second sections are partially overlapped as observed from the longitudinal axis.

2. The lens driving module as claimed in claim 1, wherein each of the magnetic members comprises an inclined surface facing the driving coil.

3. The lens driving module as claimed in claim 1, wherein a gap is formed between two first magnetic members on the same sides of the driving coil.

4. The lens driving module as claimed in claim 3, wherein the lens driving module further comprises a third magnetic member, disposed in the gap.

5. The lens driving module as claimed in claim 4, wherein the width of the third magnetic member is less than that of the first magnetic member.

6. The lens driving module as claimed in claim 4, wherein the third magnetic member does not protrude from the outer surface of the first magnetic member.

7. The lens driving module as claimed in claim 1, wherein the first magnetic member comprises a depression, and the driving coil enters the depression.

8. The lens driving module as claimed in claim 1, wherein the length of the driving coil exceeds the width of the driving coil.

9. The lens driving module as claimed in claim 1, wherein the distance between the driving coil and the outer surface of the first magnetic member is less than the distance between the driving coil and the outer surface of the second magnetic member.

10. The lens driving module as claimed in claim 1, wherein the longitudinal axis of the longitudinal structure is perpendicular to the first direction.

11. The lens driving module as claimed in claim 1, wherein the lens driving module further comprises:

a frame, receiving the lens holder, wherein the first magnetic members and the second magnetic members are affixed to the frame;

a first elastic member, connecting the lens holder and the frame; and a second elastic member, connecting the lens holder and the frame, wherein the lens holder is disposed between the first elastic member and the second elastic member.

12. The lens driving module as claimed in claim 11, wherein the lens driving module further comprises:

a base, comprising a coil plate; and a plurality of suspension wires, connecting the coil plate and the first elastic member, wherein when a second current flows through the coil plate, the lens holder moves relative to the base along a second direction, wherein the first direction is perpendicular to the second direction.

13. The lens driving module as claimed in claim 12, wherein the base further comprises a circuit board electrically connected to the coil plate.

14. The lens driving module as claimed in claim 12, wherein the lens driving module further comprises a position detector disposed on the base.

15. The lens driving module as claimed in claim 14, wherein the position detector comprises a Hall sensor, a magnetoresistance effect sensor, a giant magnetoresistance effect sensor, a tunneling magnetoresistance effect sensor, or a fluxgate sensor.

16. A lens driving module for holding and moving a lens, comprising:

a lens holder, having an accommodating space, wherein the lens is disposed in the accommodating space;

a driving coil, disposed on the lens holder, surrounding the accommodating space, and having a first section and a second section, wherein the extending direction of the first section is different from the extending direction of the second section;

a plurality of first magnetic members, having a longitudinal structure, wherein the driving coil is disposed between the first magnetic members, and does not surround the first magnetic members as observed from an optical axis of the lens; and a virtual plane, perpendicular to the longitudinal axis of the longitudinal structure, wherein the projections of the driving coil and the first magnetic members on the virtual plane along the longitudinal axis overlap each other, wherein when a first current flows through the driving coil, the lens holder moves relative to the first magnetic members along a first direction, wherein at least a portion of the first section is disposed between the first magnetic members, at least a portion of the second section is disposed between the first magnetic members, and the magnetic members and the first and second sections are partially overlapped as observed from the longitudinal axis.

* * * * *